United States Patent
Weisbrod et al.

(10) Patent No.: US 9,319,891 B2
(45) Date of Patent: Apr. 19, 2016

(54) METHOD AND APPARATUS FOR LEVERAGING WIRELESS COMMUNICATION USING AN AERIAL VEHICLE

(71) Applicant: Verizon Patent and Licensing Inc., Arlington, VA (US)

(72) Inventors: Fred Weisbrod, Renton, WA (US); Donna L. Polehn, Kirkland, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 29 days.

(21) Appl. No.: 14/313,677

(22) Filed: Jun. 24, 2014

(65) Prior Publication Data

US 2015/0373558 A1 Dec. 24, 2015

(51) Int. Cl.
*H04W 4/00* (2009.01)
*H04W 16/28* (2009.01)
*H04W 4/22* (2009.01)
*H04W 24/08* (2009.01)
*H04W 16/26* (2009.01)
*H04B 1/3822* (2015.01)

(52) U.S. Cl.
CPC .............. *H04W 16/28* (2013.01); *H04B 1/3822* (2013.01); *H04W 4/22* (2013.01); *H04W 16/26* (2013.01); *H04W 24/08* (2013.01)

(58) Field of Classification Search
CPC ........................................................ H04W 4/00
USPC ........................ 455/3.06, 414.1, 98
See application file for complete search history.

(56) References Cited

U.S. PATENT DOCUMENTS

| | | | | |
|---|---|---|---|---|
| 6,054,947 A * | 4/2000 | Kosowsky | .............. | G01S 13/89 342/191 |
| 6,437,742 B1 * | 8/2002 | Niesen | ..................... | G01S 3/02 342/418 |
| 2003/0129985 A1 * | 7/2003 | Naden | .................. | H04B 1/7097 455/447 |
| 2009/0021434 A1 * | 1/2009 | Lee | ........................ | H01Q 21/00 343/703 |
| 2010/0328138 A1 * | 12/2010 | Guigne | ................. | G01S 13/913 342/33 |
| 2013/0094543 A1 * | 4/2013 | Zhang | .................. | H04L 5/0023 375/219 |

\* cited by examiner

*Primary Examiner* — Christopher M Brandt

(57) ABSTRACT

An approach is provided for providing wireless communication in a remote area by using an aerial vehicle. Signal strength information received at a plurality of antennas mounted over the aerial vehicles is monitored. The antennas are associated with a plurality of stabilizing control mechanisms of the aerial vehicle. The signal strength information is processed to determine control adjustment information, which is then transferred to the stabilizing control mechanisms for orienting the aerial vehicle such that maximum signal is reflected and/or repeated from the aerial vehicle.

20 Claims, 14 Drawing Sheets

METHOD AND APPARATUS FOR LEVERAGING WIRELESS COMMUNICATION USING AN AERIAL VEHICLE

BACKGROUND INFORMATION

Consumer adoption of mobile devices for wireless communication, such as cellular telephones, mobile phones, pagers, tablets, personal digital assistants, and the like, are increasing every day. Mobile devices communicate through a network of communication towers spread over a geography. However, placing communication towers may not be feasible at various locations due to space constraints, geography, or other issues. Moreover, in situations involving natural disasters such as earthquake, tsunami, floods, or storms, communication towers may be damaged, resulting in insufficient coverage of communication signals in the affected area.

Generally, mobile vehicles with communication towers are used to reach such affected areas to provide network signals for wireless communication. However, natural disasters may make it difficult to position such vehicles in the appropriate location due to damaged roads or transport paths. Geographical landforms such as mountains ranges may also obstruct communication between a base tower to a communication tower of the mobile vehicle placed in a valley or other side of the mountain. Further, such mobile vehicles provide only a limited coverage area due to lack of height of the antennas, which is a critical factor for wireless communication coverage. Hot air balloons or gas balloons may be used to lift the antennas to a desired height for appropriate coverage; however, it is difficult to maintain their position due to environmental factors (e.g., wind currents).

Therefore, there is a need for an apparatus that can seamlessly provide wireless signals for communication.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for leveraging wireless communication using an aerial vehicle. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to various enumerated radio access technologies and application services, it is contemplated that various exemplary embodiments are also applicable to other suitable or equivalent access technologies and application services.

Figure 1:
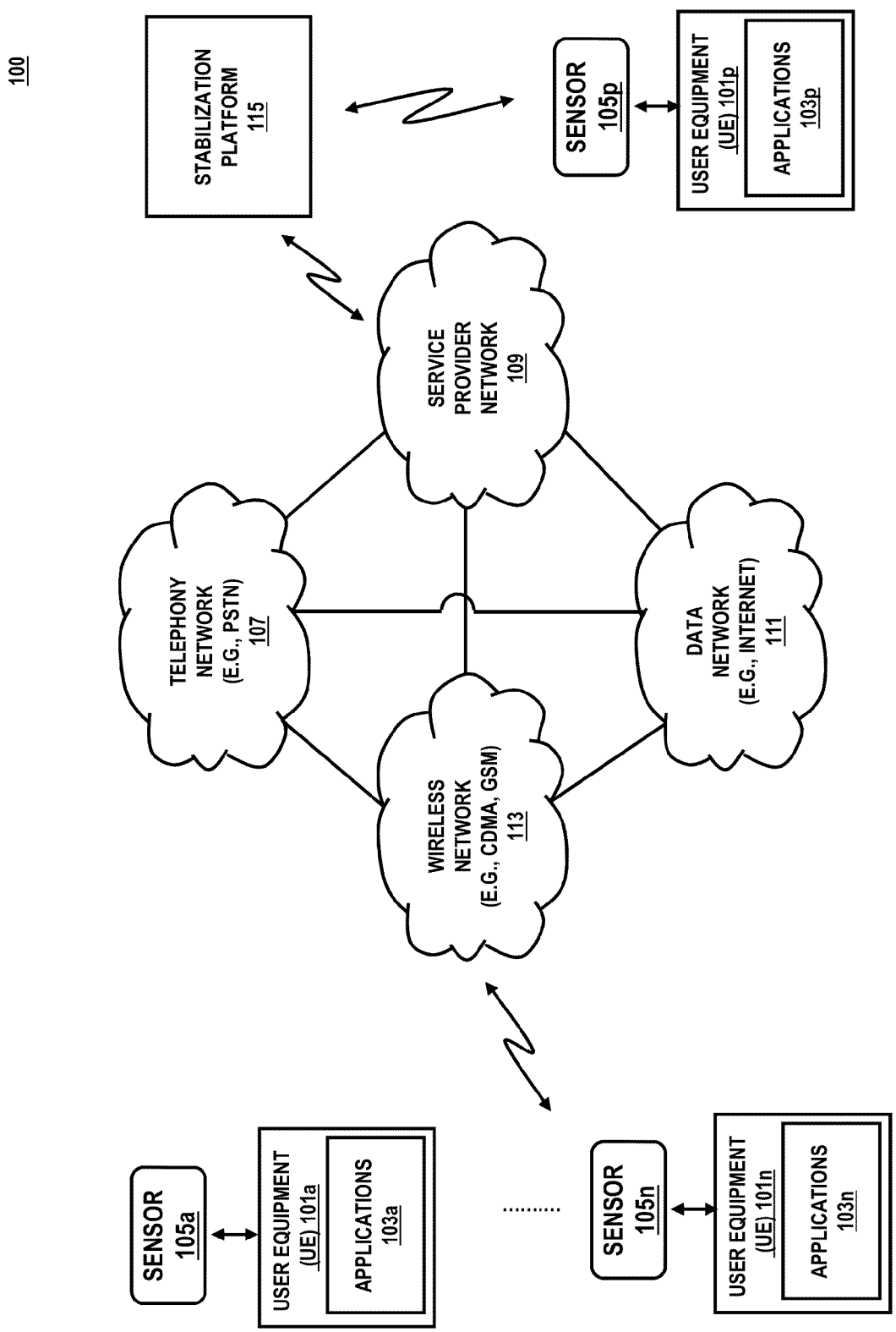
FIG. 1 is a diagram of a communication system capable of providing radio transmission to a remote location, according to an exemplary embodiment.

FIG. 1 is a diagram of a communication system 100 capable of providing communication signal in a remote area, according to an exemplary embodiment. For the purpose of illustration, the communication system 100 can include a plurality of communication networks that support a number of wireless user equipment 101a-101n, which may be fixed or mobile, using various radio access technologies. According to certain embodiments, the user equipment 101a-101n communicates with the plurality of communication networks according to third generation partnership project (3GPP) long term evolution (3GPP LTE) architecture. However, other radio technologies are contemplated: cellular digital packet data (CDPD), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (Wi-Fi), has been introduced for wireless local area networking, while the IEEE 802.16 standard, also known as worldwide interoperability for microwave access (WiMAX), has been introduced for the provision of wireless communications on point-to-point links, as well as for full mobile access over longer distances. Other examples include Bluetooth, ultra-wideband (UWB), the IEEE 802.22 standard, etc.

By way of example, the communication network may include a telephony network 107, a service provider network 109, a data network 111, and a wireless network 113. It is contemplated that the data network 111 may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, the telephony network 107 can be provided via a combination of circuit-switched technologies or a packetized voice infrastructure.

In the example of FIG. 1, in an embodiment, the wireless network 113 can include a base station (not shown) that establishes a downlink channel (from the wireless network 113 to the user equipment 101a-101n) for communication, according to Orthogonal Frequency-Division Multiplexing (OFDM). The OFDM advantageously provides for spectrum flexibility and enables cost-efficient solutions for wide carriers with high peak rates. OFDM is used, for example, in standards such as IEEE 802.11a/g, 802.16, HIPERLAN-2, digital video broadcasting (DVB) and digital audio broadcasting (DAB). In the uplink channel, the communication network can use a pre-coded version of OFDM called Single Carrier Frequency Division Multiple Access (SC-FDMA), according to one embodiment. It is contemplated other protocols may be utilized.

The communication system 100 further comprises a stabilization platform 115 mounted over an aerial vehicle (not shown) for providing network services to at least one user equipment 101p situated at a remote area. In one embodiment, the stabilization platform 115 enables the user equipment 101p to communicate with the service provider network 109 using the sensor 105p and the application 103p. The stabilization platform 115 helps to maintain the position of the aerial vehicle such that optimal radio signals can be received and transmitted from the base station to the user equipment at the remote area. The components of the stabilization platform 115 are described is detailed in conjunction with FIG. 2.

Figure 2:
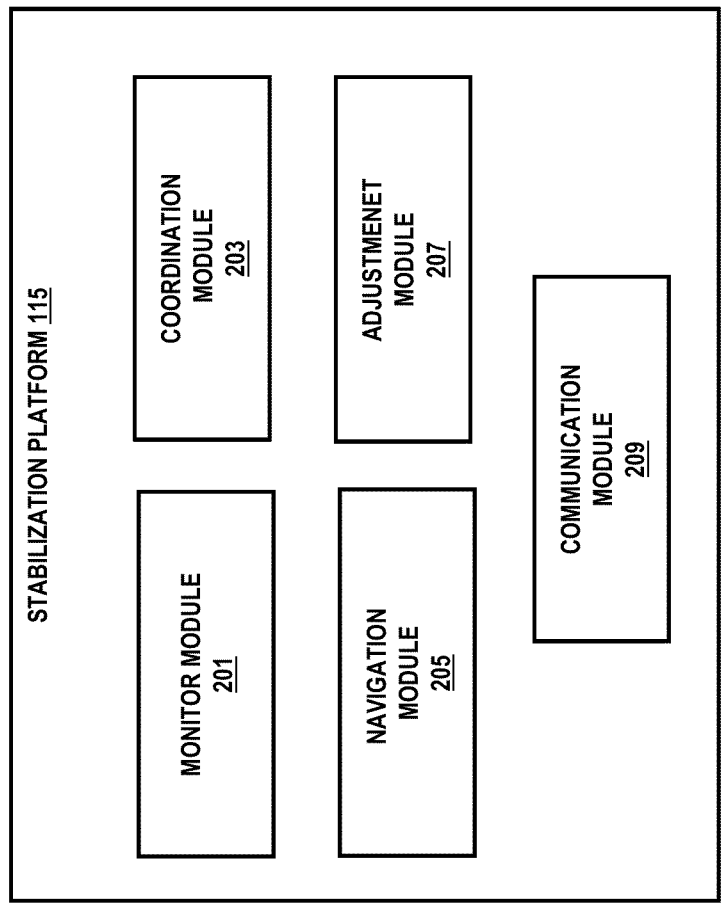
FIG. 2 is a diagram of components of a stabilization platform of the communication system disclosed in FIG. 1, according to an exemplary embodiment.

FIG. 2 discloses the components of the stabilization platform 115 of the communication system 100 disclosed in FIG. 1, according to an exemplary embodiment. For the purpose of illustration, the stabilization platform 115 includes a monitor module 201, a coordination module 203, a navigation module 205, an adjustment module 207, and a communication module 209.

In one embodiment, the stabilization platform 115 is mounted over an aerial vehicle such as a gyrocopter, a helicopter, a drone or any other aerial vehicle which can stay geostationary in the sky and can fly at a considerable height above the remote area. The remote area can be a village, a town or an area with settlement which is affected from natural disaster such that the network of communication towers is affected. Further, the aerial vehicle is mounted with a radio signal repeater or radio signal reflector for transmitting the radio signal received from the base station to the remote area. In one embodiment, the monitoring module 201 of the stabilization platform 115 monitors the radio signals received from the base station. The monitoring module 201 is linked with a plurality of antennas mounted at different angles over the aerial vehicle such that all the directions in the horizontal plain are covered.

In one embodiment, the signal strength information received at each of the plurality of antennas is transmitted by the monitoring module 201 to the coordination module 203. In an embodiment of the invention, four antennas are mounted over the aerial vehicle such that each of the antennas covers a quadrant of 90 degrees in the horizontal plane and captures signal strength information for that quadrant. Further, the coordination module 203 then computes the difference between the signal strength information received at each of the antennas. Further, the adjustment module 207 computes control adjustment information based on the difference between the signal strength information received at each of the antennas. The control adjustment information signifies the coordinate and the orientation of the aerial vehicle which is required to receive approximately equal/maximum signal strength at all the antennas. This control adjustment information is then used by the navigation module 205 to navigate the aerial vehicle to the appropriate location and orient it at an angle such that each of the plurality of antennas receives approximately equal signal strength.

In one embodiment, once the signal strength information received at all the antennas of the aerial vehicle are equal, the adjustment module 207 signals the communication module 209 to activate the radio signal reflector/repeater mounted on the aerial vehicle to start transmitting the radio signals received from the base station to the remote area. The altitude at which the aerial vehicle is flying can be adjusted such that maximum region of the remote area is covered by the radio signal reflector/repeater with a desirable amount of signal strength. In an embodiment, the signal strength may be pre-defined by a network provider and the altitude of the aerial vehicle is maintained based on this pre-defined signal strength.

Figure 3:
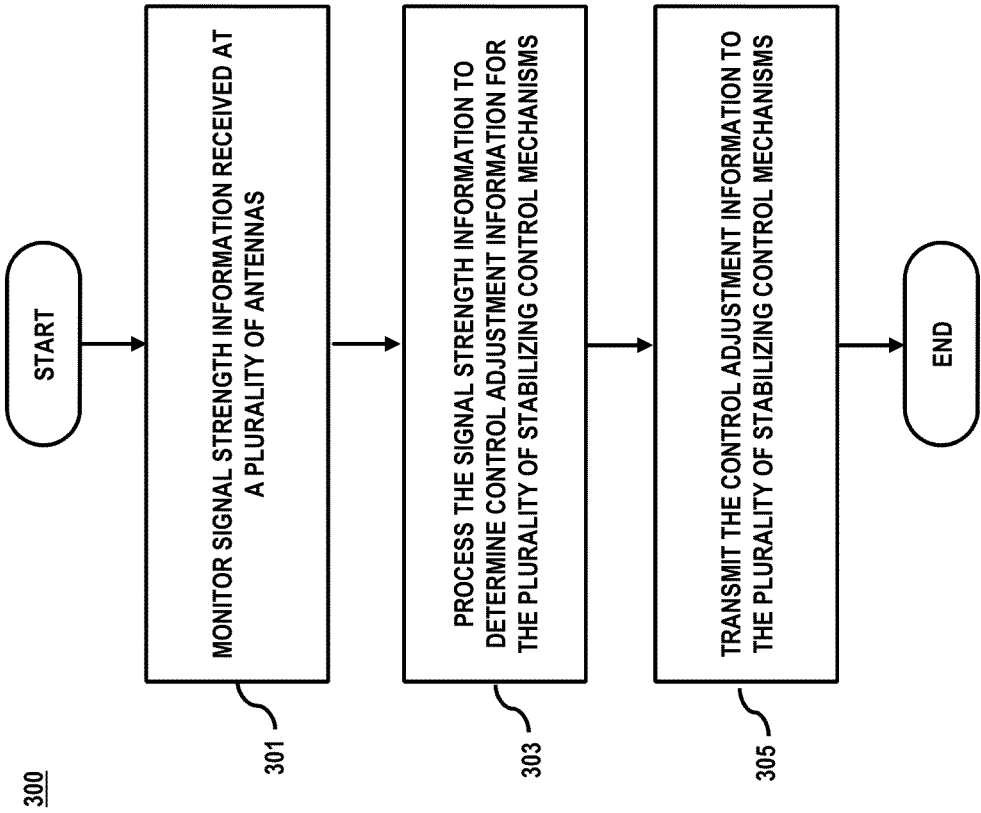
FIGS. 3, 4, and 5 are flowcharts of a process for adjusting orientation of an aerial vehicle to achieve maximum radio signal transmission, according to various exemplary embodiment.

FIG. 3 is a flowchart of a process for adjusting orientation of an aerial vehicle to achieve optimal signal transmission, according to an exemplary embodiment. In one embodiment, the signal can be a radio signal, more specifically, microwave signal used for wireless cellular communication. Hereafter, the radio signal or the microwave signal is referred to as signal. At step 301, the signal strength information received at the plurality of antennas mounted over the aerial vehicle is monitored by the stabilization platform 115. The antennas are used to determine the signal strength received from different directions while the aerial vehicle is flying over the remote area.

At step 303, the signal strength information is processed by the stabilization platform 115 to determine the control adjustment information based on the signal strength information received from the plurality of antennas. The control adjustment information specifies the controls signals to position and/or orient the aerial vehicle for achieving maximum signal strength at all the antennas. The control adjustment information is further used by a plurality of stabilizing control mechanisms.

Further, at step 305, the control adjustment information is transmitted to the plurality of stabilizing control mechanisms for positioning and orienting the aerial vehicle. In one embodiment, stabilizing control mechanisms include a plurality of stabilizing propellers. The control adjustment information includes propeller speed adjustment information for the plurality of stabilizing propellers. Further, a control platform determines the control adjustment information so that the signal strength information received at each of the plurality of antennas is substantially equal and or maximized. The functioning of the stabilization mechanism is described in conjunction with the flowchart of FIG. 4.

Figure 4:
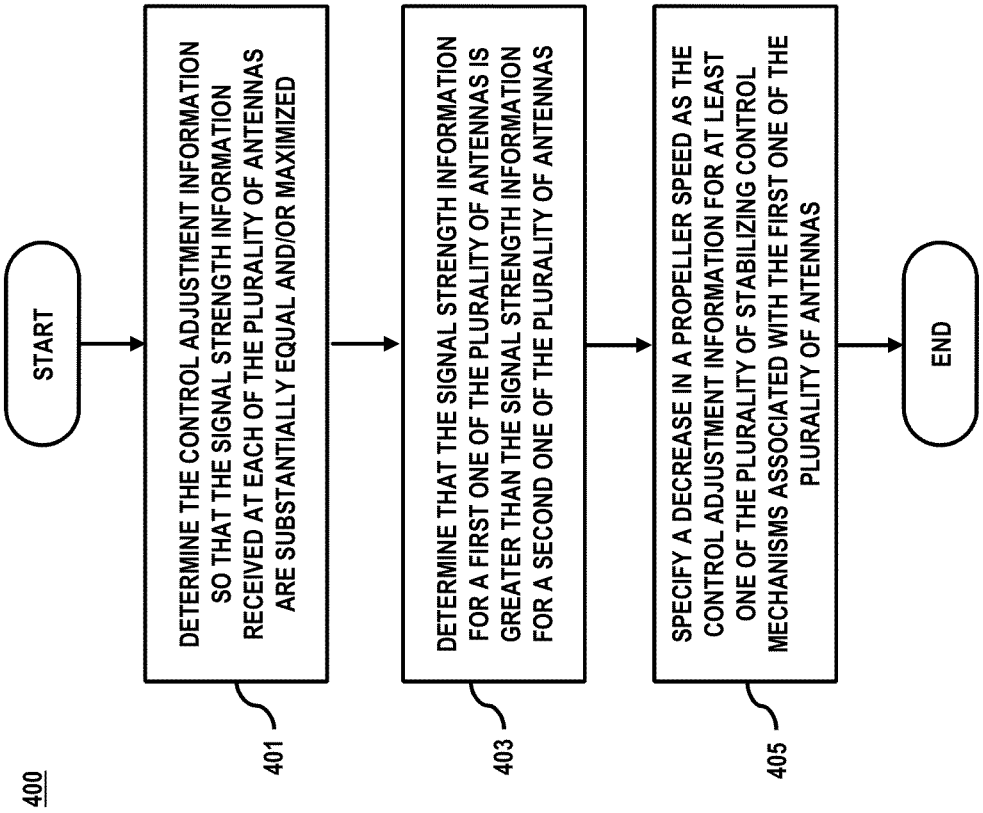

FIG. 4 is a flowchart of a process for using the adjustment control information for stabilizing the aerial vehicle to achieve maximum signal transmission, according to an exemplary embodiment. At step 401, the control adjustment information such that the signal strength information received at each of the plurality of antennas are substantially equal and/or maximized is transmitted to the stabilization mechanism.

Further, at step 403, it is determined if the signal strength information for a first antenna from the plurality of antennas is greater than or less than the signal strength information for a second antenna of the plurality of antennas. In one embodiment, each of the plurality of antennas is associated with at least one stabilization control mechanism. Further, each of the stabilization control mechanism is connected to at least one propeller of the aerial vehicle.

Further, at step 405, if the signal strength information for the first antenna is greater than or less than the signal strength information of the second antenna, the control adjustment information is generated. This control adjustment information is used by the navigation system of the aerial vehicle to decrease or increase the propeller speed associated with the first antenna or the second antenna.

Figure 5:
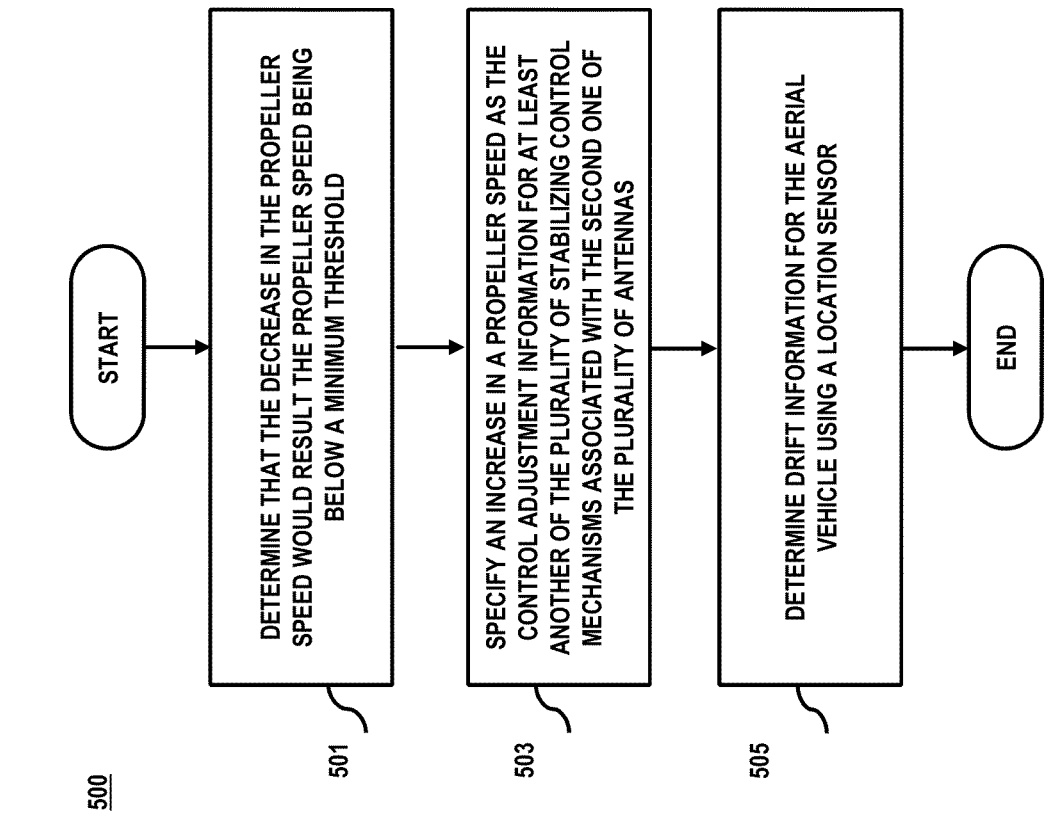

FIG. 5 is a flowchart of a process for adjusting the propeller speed based on the control adjustment information to achieve maximum signal transmission, according to an exemplary embodiment. At step 501, it is determined if the speed of the propeller specified by the control adjustment information for a first propeller is below a minimum threshold. In one embodiment, the control adjustment information may specify a sharp decrease in the propeller speed in order to turn the aerial vehicle by more than 90 degrees. However, if the speed of the propeller is too low, it might make the vehicle unstable.

At step 503, an increase in the speed of a propeller associated with the second antenna from the plurality of antennas is specified by the control adjustment information to achieve the desired position and orientation of the aerial vehicle. Further, at step 505, the drift information associated with the aerial vehicle caused due to air currents is considered for maintaining the specified location of the aerial vehicle in the sky.

Figure 6:
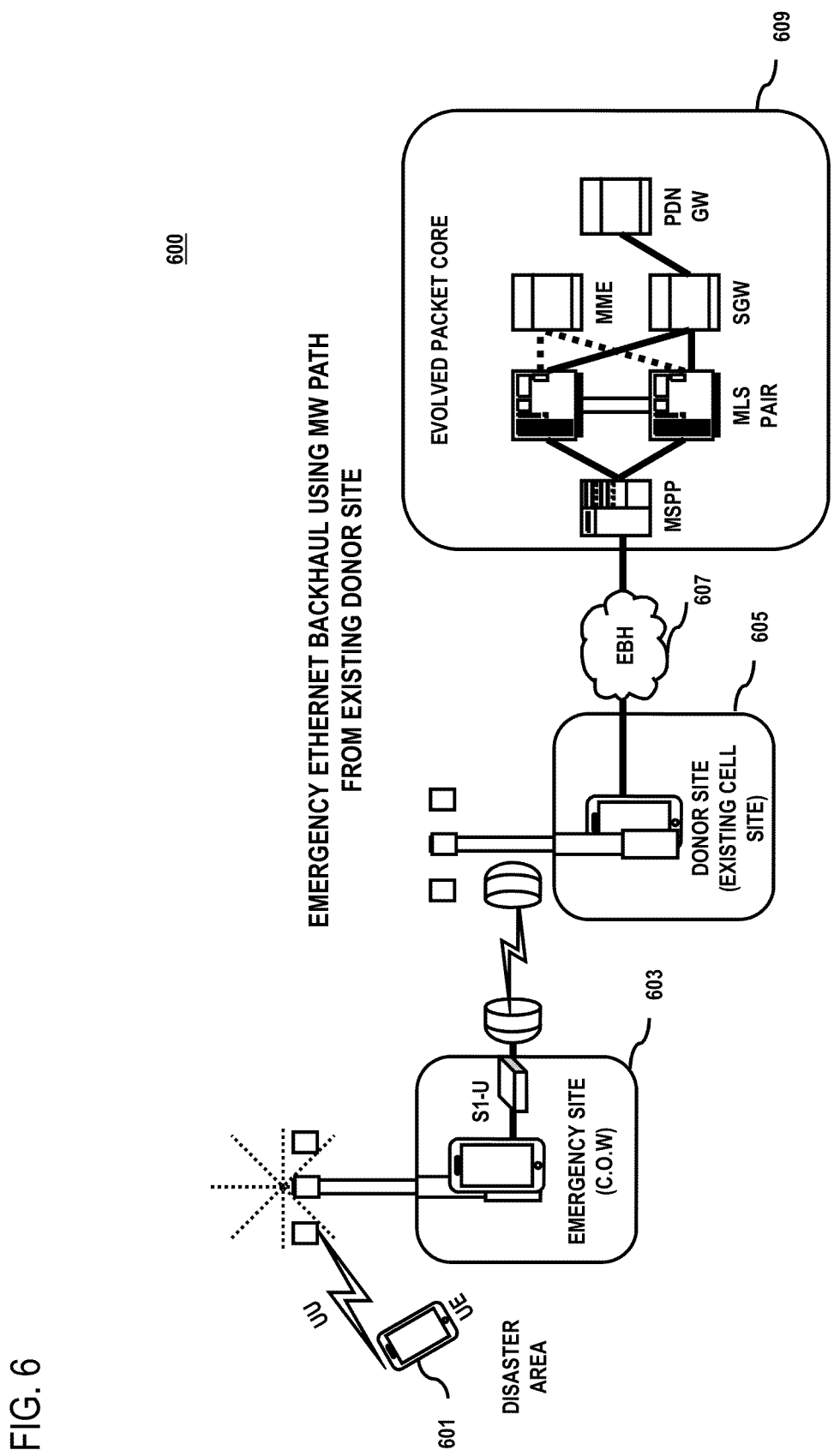
FIG. 6 is a diagram of a conventional emergency Ethernet backhaul system for transmitting signals in a remote area, according to an exemplary embodiment.

FIG. 6 is diagrams of a conventional emergency Ethernet backhaul system 600 for transmitting signals in a remote area, according to an exemplary embodiment. The backhaul system 600 comprises of evolution packet core 609 which is further connected to donor site 605 through an Ethernet Backhaul (EBH) 607. The donor site 605 provides microwave signals to an emergency site 603. The emergency site 603 can be a radio transmission system mounted over a mobile vehicle. The mobile site 603 further provides cellular network to user equipment 601 situated at the remote area. However, such a type of system does not work if there is a natural obstruction such as a mountain, trees, buildings, etc. between the donor site 605 and the emergency site 603. The problem is further exacerbated since there is often no communication tower available at the remote area.

Figure 7:
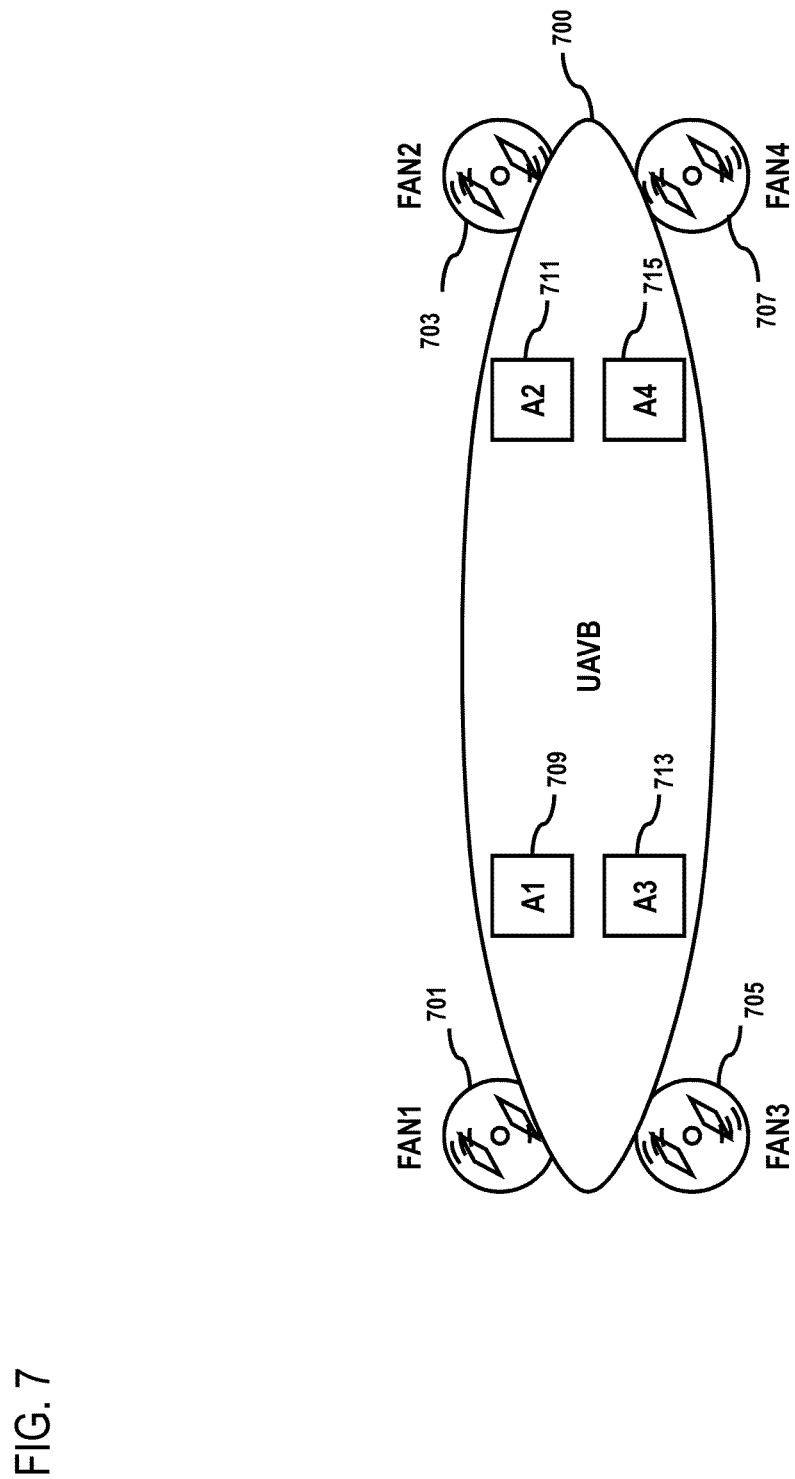
FIG. 7 is a diagram of an aerial vehicle for transmitting radio signals in a remote area, according to an exemplary embodiment.

FIG. 7 is a diagram of an aerial vehicle 700 for transmitting communication signals in a remote area, according to an exemplary embodiment. In one embodiment, the aerial vehicle 700 can be an Unmanned Aerial Vehicle Battlelab (UAVB). The aerial vehicle 700 is attached with a Global Positioning System (GPS) tracking device (not shown) to navigate the aerial vehicle 700 to the desired location over the remote area. Once the aerial vehicle 700 has reached the desired location over the remote area, the GPS tracking device locks the position and instructs the aerial vehicle 700 to continue flying over at the same location. Further, the aerial vehicle 700 may include a battery bank for flying the aerial vehicle 700. In one embodiment, the battery bank level is regularly monitored, and if the power drops below a certain level the GPS can be used to navigate the aerial vehicle 700 back to a home base where battery bank can be changed or recharged. In one embodiment, two or more aerial vehicles can be used in shifts to extend operational time and provide overlapping coverage to a larger area.

In one embodiment, the aerial vehicle 700 comprises of four propellers namely Fan1 701, Fan2 703, Fan3 705, and Fan4 707. The aerial vehicle 700 has four different microwave antennas A1 709, A2 711, A3 713, and A4 715. The microwave antenna A1 709 is electronically coupled to Fan1 701 by means of a controller device not shown. The microwave antennas A2 711, A3 713 and A4 715 are coupled to the propellers Fan2 703, Fan3 705, and Fan4 707 respectively. Based on the signal strength received at the microwave antennas A1 to A4, the speed of the propeller Fan1 to Fan 4 is regulated such that the aerial vehicle 700 aligns itself to achieve maximum and/or equal microwave signals at all the microwave antennas A1 to A4. In one embodiment, the propellers are used to fly the aerial vehicle 700 and maintain the orientation so that all the antennas A1 to A4 receive equal microwave signal. Further, the number of propellers and microwave antennas can be increased or decreased from four to or any number based on the requirement or design. The process of using the microwave signals to adjust the speed of the propellers Fan1 to Fan4 is described in conjunction with the diagram of FIG. 8.

Figure 8:
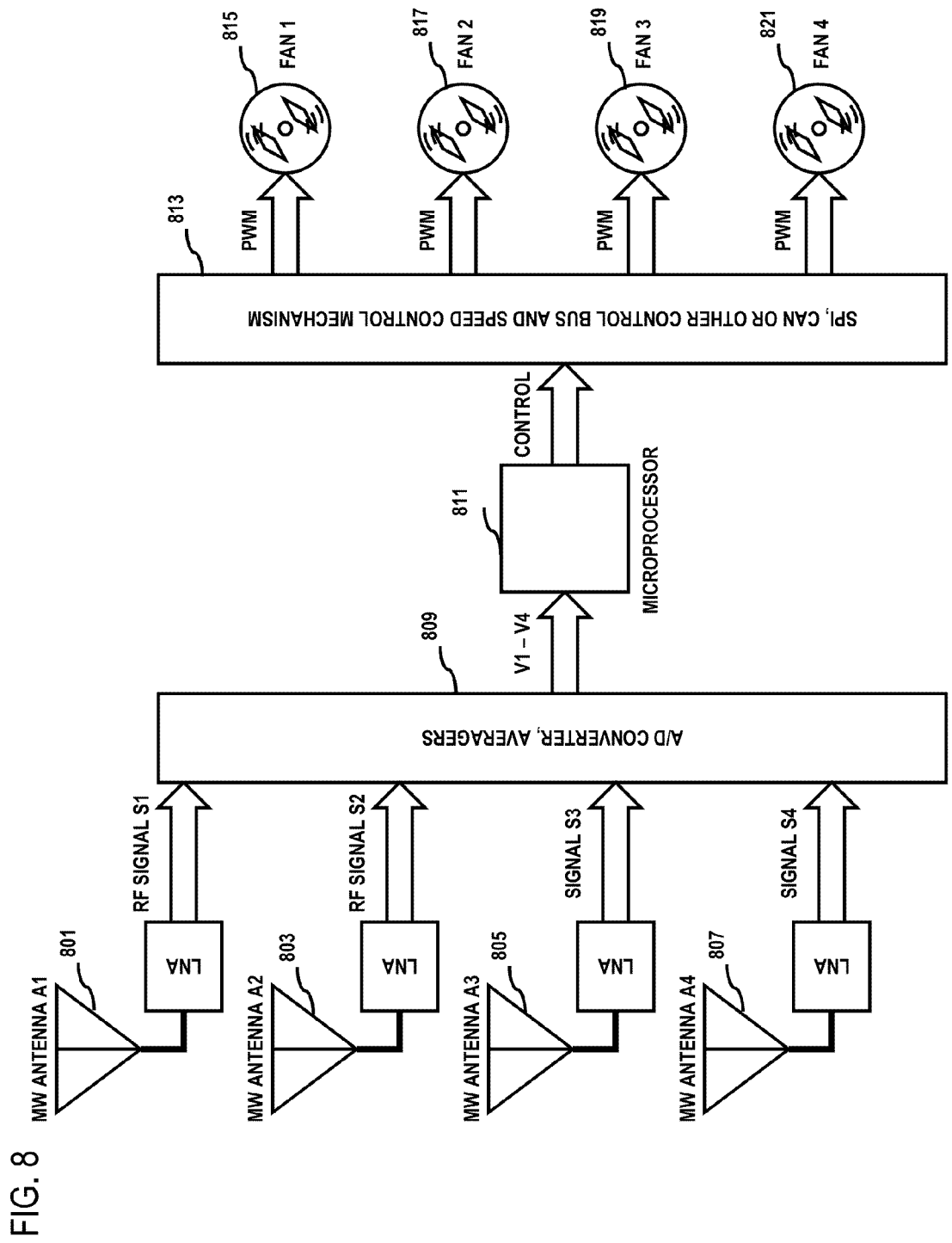
FIG. 8 is a diagram of a control system for positioning the aerial vehicle in air, according to an exemplary embodiment.

FIG. 8 is a diagram of a stabilizing control mechanism 800 for positioning the aerial vehicle 700 in air, according to an exemplary embodiment. The stabilizing control mechanism 800 comprises of four microwave antennas A1 801, A2 803, A3 805 and A4 807. In one embodiment, the microwave antennas A1 to A4 comprise an untethered microcell, a tethered microcell, or a combination thereof. Each of these microwave antennas is connected to an Analog to Digital Converter (ADC) 809 through a Low Noise Amplifier (LNA) device. The LNA device amplifies the radio frequency signal S1 to S4 received from each of the antennas A1 to A4 and transmits them to the ADC 809. The ADC 809 converts each of the analog radio frequency signal S1 to S4 into a digital equivalent V1 to V4. Further, the ADC 809 transfers the digital equivalent V1 to V4 to the microprocessor 811. Based on the difference between the signal strength S1 to S4, the microprocessor 811 generates control signals and transmits them to a speed control mechanism 813. The control signals may be Pulse Width Modulation (PWM) signals and are individually generated for a plurality of propellers FAN1 815, FAN2 817, FAN3 819, and FAN4 821. The position and orientation of the aerial vehicle 700 are maintained by continuously generating control signals for the propellers FAN1 to FAN4 based on the signal strength values received from the microwave antennas A1 to A4.

Figure 9:
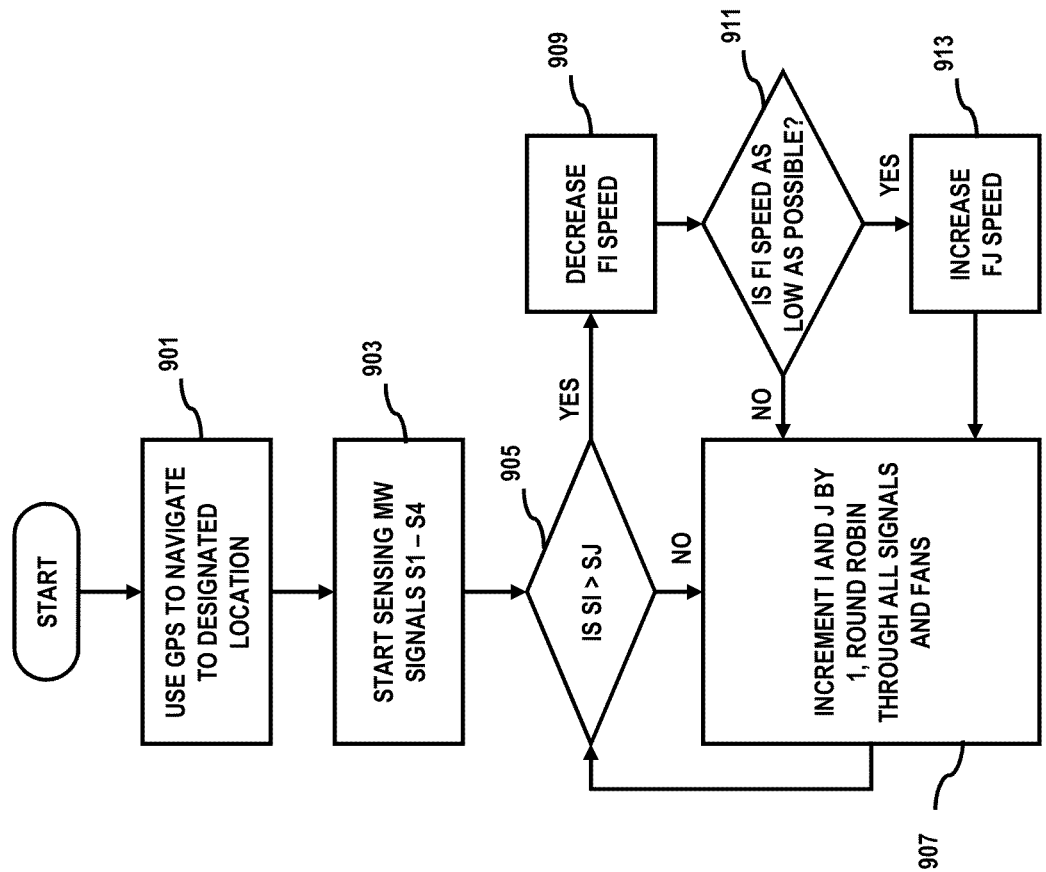
FIG. 9 is a flowchart for positioning the aerial vehicle based on a signal strength, according to an exemplary embodiment.

FIG. 9 is a flowchart for positioning the aerial vehicle 700 based on the signal strength, according to an exemplary embodiment. At step 901, GPS is used to navigate the aerial vehicle 700 to the desired location over a remote area. In one embodiment, for the purpose of navigation, a blimp (not shown) is provided for transporting the aerial vehicle 700. At the next step 903, the microwave antennas are activated to sense the signals at that particular location. At step 905, the difference between the signal strengths Si and Sj received from a pair of microwave antennas is identified. If there is no difference between Si and Sj, then at step 907, the next pair of microwave antennas is considered for comparison. The steps 905 and 907 work as a continuous loop for monitoring the difference between the signal strength received at each of the antennas. In an embodiment, a round robin like approach may be used for comparison. If there is a difference between the signal strength of Si and Sj, then at step 909, the speed of the propeller Fi associated with the signal Si is decreased. In the next step 911, it is checked weather the fan speed of the propeller Fi is reached its maximum possible lower limit. If the lower limit is not reached, the step 907 is repeated to monitor the next pair of microwave antennas. If the lower limit of the propeller Fi is reached, at step 913 the speed of the propeller Fj is increased to compensate the restrictions of Propeller Fi and the execution flow is again transferred to step 907.

Figure 10:
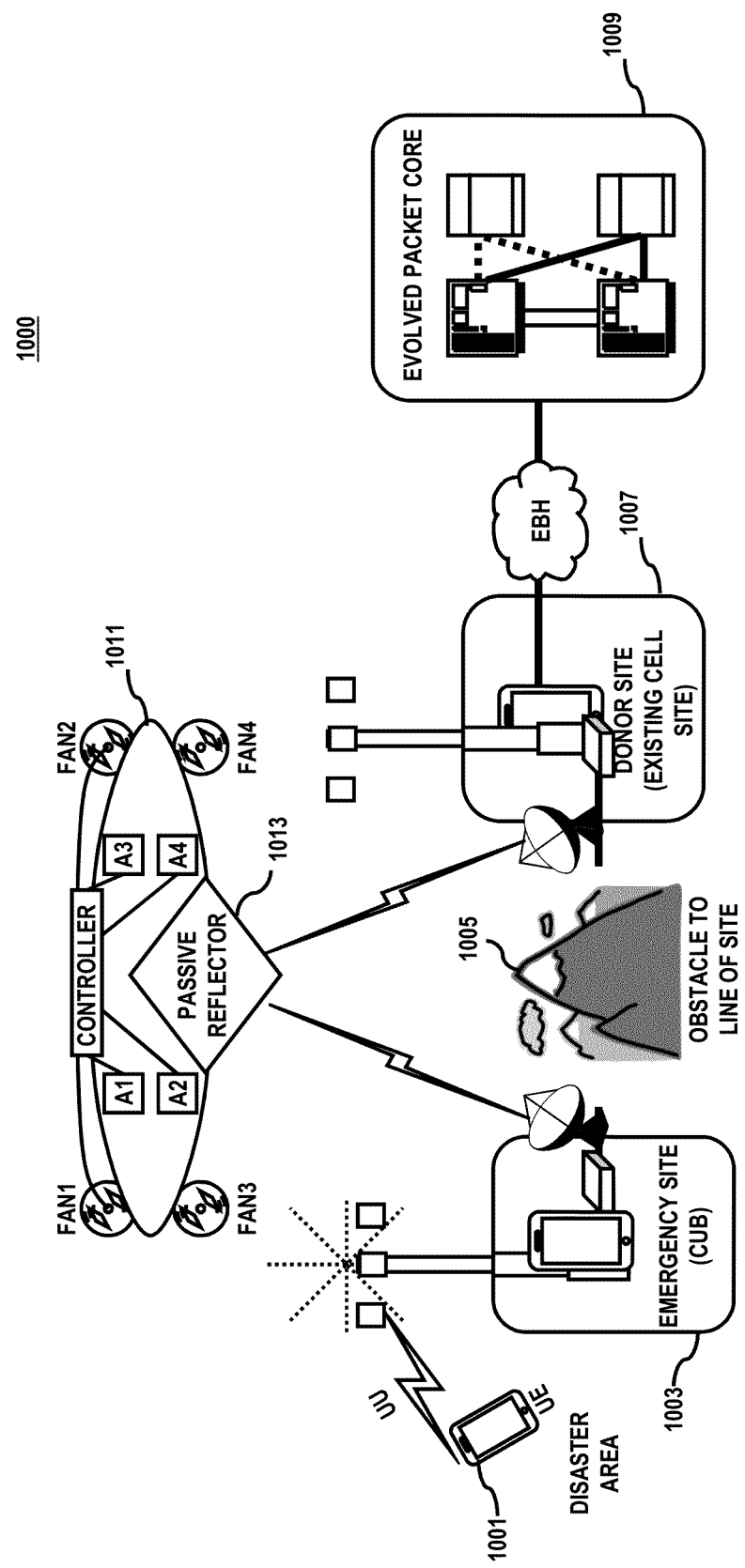
FIG. 10 is a diagram of a communication system having an untethered aerial vehicle with a passive reflector to provide radio communication signals to a remote site, according to an exemplary embodiment of the invention.

FIG. 10 is a diagram of a communication system 1000 with a passive reflector 1013 mounted over an aerial vehicle 1011 to provide communication signals to an emergency site 1003 with a Cell Under Blimp (CUB), situated at a remote area, according to an exemplary embodiment of the invention. The communication system 1000 further comprises a user equipment 1001 which can communicate with the emergency site 1003 located at the remote area using wireless communication. Further, the emergency site 1003 can communicate with a donor site 1007 using the passive reflector 1013 mounted over the aerial vehicle 1011. The passive reflector 1013 bypasses the obstacle to line of sight 1005 such as mountains present between the emergency site 1003 and donor site 1007. The aerial vehicle 1011 is positioned by a controller with the help of propellers FAN1 to FAN4 based on the signals received at microwave antennas A1 to A4 as described in FIG. 8. Further, the aerial vehicle 1011 is positioned by the controller such that maximum signal received from the donor site 1007 are reflected by the passive reflector 1013 towards the emergency site 1003. In one embodiment, a microwave repeater can be used in place of passive reflector 1013 to amplify the signals transmitted between the donor site 1007 and the emergency site 1003. Further, an evolution packet core 1009 is connected to the donor site 1007 through an EBH 607 for connecting to rest of the communication network.

Figure 11:
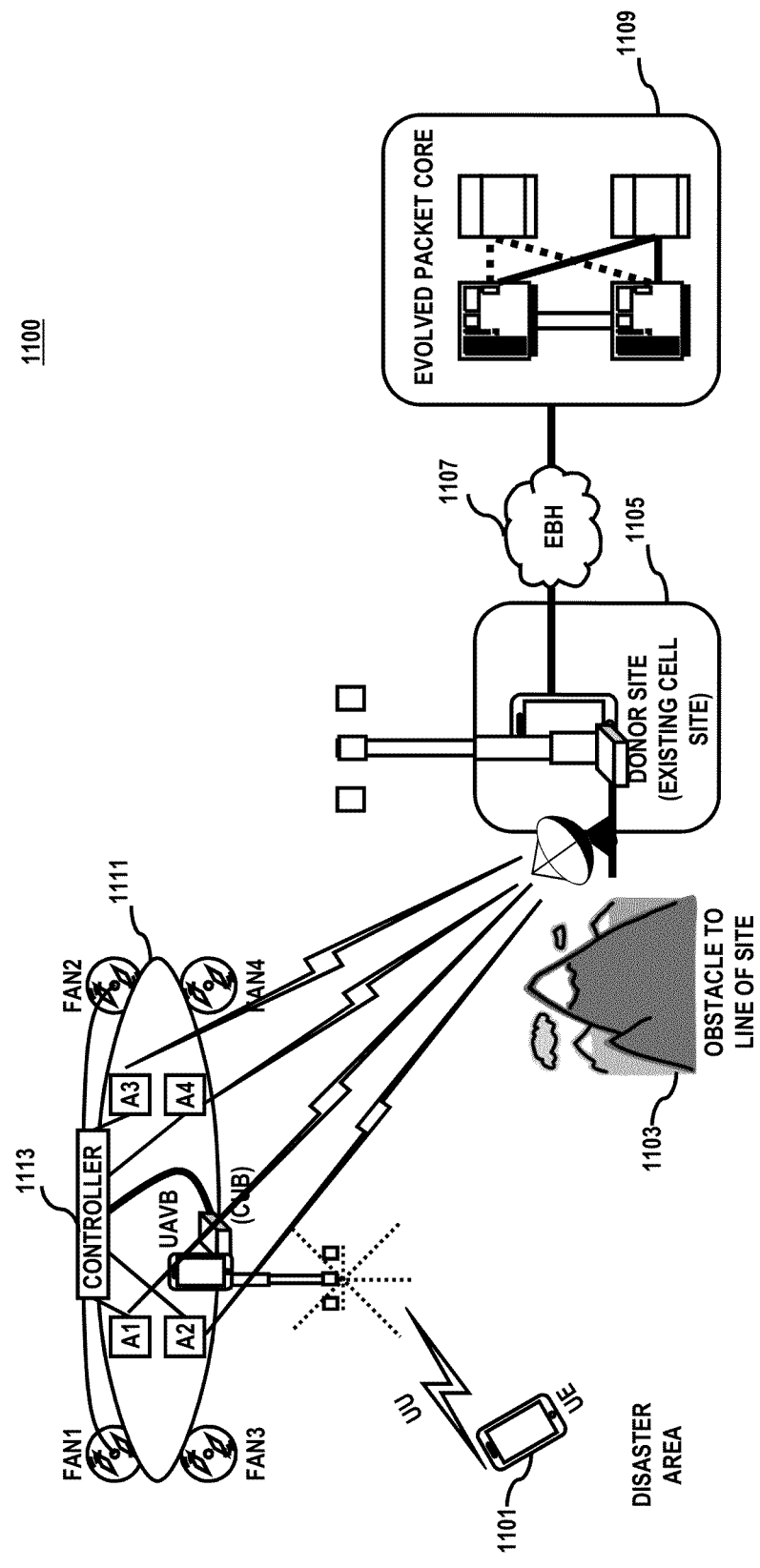
FIG. 11 is diagram of a communication system having an untethered aerial vehicle with cellular antenna to provide radio communication signals at a remote site, according to an exemplary embodiment of the invention.

FIG. 11 is a diagram of a communication system 1100 with a cellular antenna mounted over an aerial vehicle 1111 to provide communication signals to user equipment 1101 present at a remote area, according to an exemplary embodiment of the invention. The user equipment 1101 which can communicate with the cellular antenna installed over an aerial vehicle 1111, using wireless communication. Further, the cellular antenna transmits the communication signals received from the user equipment 1101 to the donor site 1105. The aerial vehicle 1111 is positioned by the controller 1113 with the help of propellers FAN1 to FAN4 based on the signals received at microwave antennas A1 to A4 as described in FIG. 8. Further, the aerial vehicle 1111 is positioned such that the optimal network coverage from the donor site 1105 can be provided to the user equipment 1101 by the cellular antenna mounted over the aerial vehicle 1111. Further, an evolution packet core 1109 is connected to the donor site 1105 through an EBH 1107 for connecting with the rest of the communication network. In one embodiment, the signals captured from the donor site 1105 by the plurality of antennas A1 to A4 is transmitted to the user equipment 1101 for cellular communication.

Figure 12:
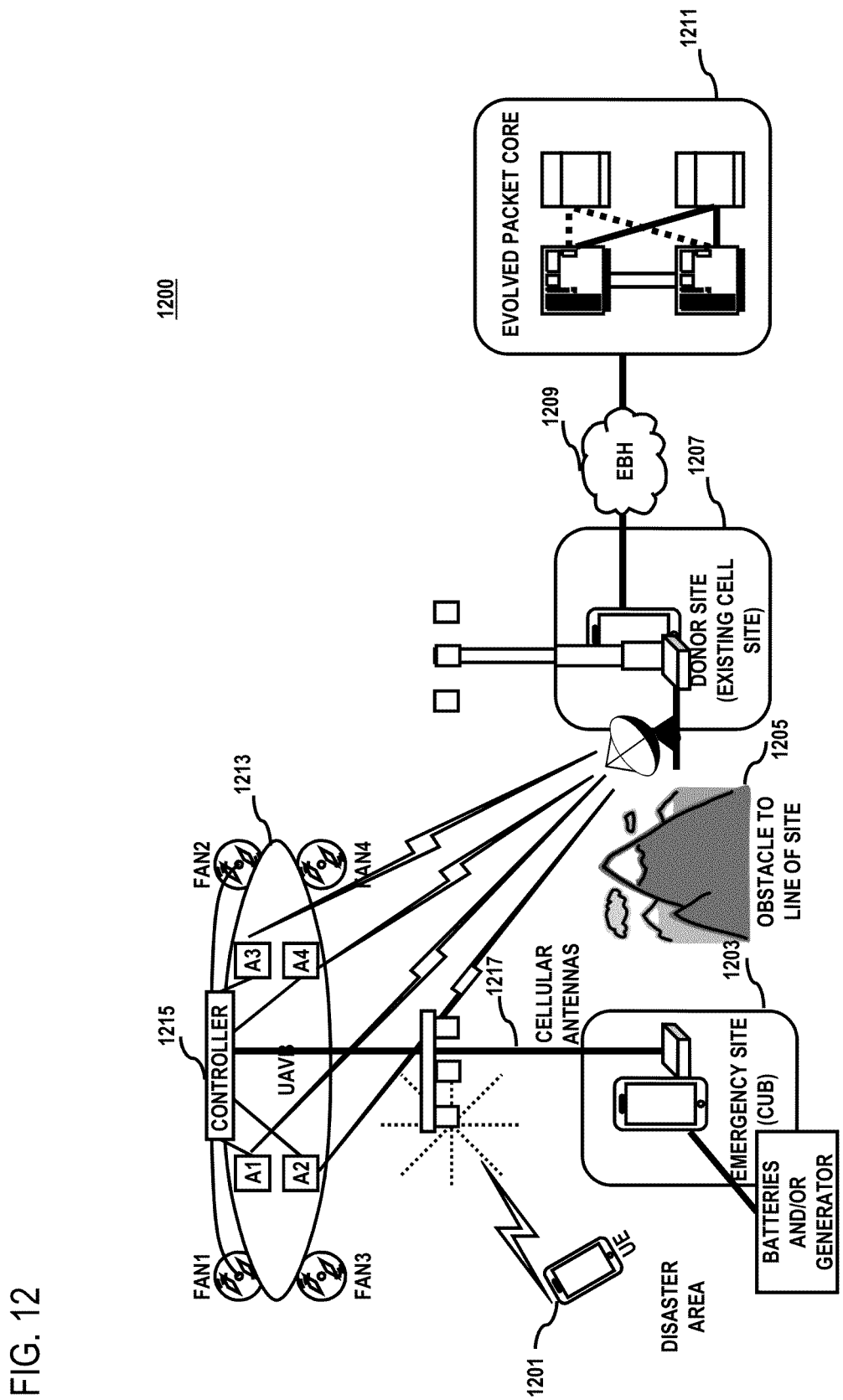
FIG. 12 is diagram a communication system having an aerial vehicle tethered to an emergency site to provide radio communication signals at a remote site, according to an exemplary embodiment of the invention.

FIG. 12 is a diagram of a communication system 1200 with an aerial vehicle 1213 tethered to an emergency site 1203 to provide communication signals to user equipment 1201, according to an exemplary embodiment of the invention. The emergency site 1203 is tethered to an aerial vehicle 1213 using a wired connection. In one embodiment, emergency site 1203 is equipped with a battery and or a generator to provide power supply to the aerial vehicle 1213 and extend operating time. In one embodiment, a cellular antenna 1217 is placed between the emergency site 1203 and aerial vehicle 1213. The user equipment 1201 can communicate with the cellular antenna 1217 of the emergency site 1203 using wireless communication. The cellular antenna 1217 can communicate with donor site 1207 using wireless communication. The aerial vehicle 1213 is positioned by the controller 1215 with the help of propellers FAN1 to FAN4 based on the signals received at microwave antennas A1 to A4 as described in FIG. 8. Further, the aerial vehicle 1213 is positioned such that the cellular antenna 1217 provides optimal signal transmission between the user equipment 1201 and the donor site 1207. Further, an evolution packet core 1211 is connected to the donor site 1207 through an EBH 1209 for connecting to rest of the communication network. In one embodiment, the signals captured from the donor site 1207 by the plurality of antennas A1 to A4 is transmitted to the user equipment 1201 for cellular communication.

Figure 13:
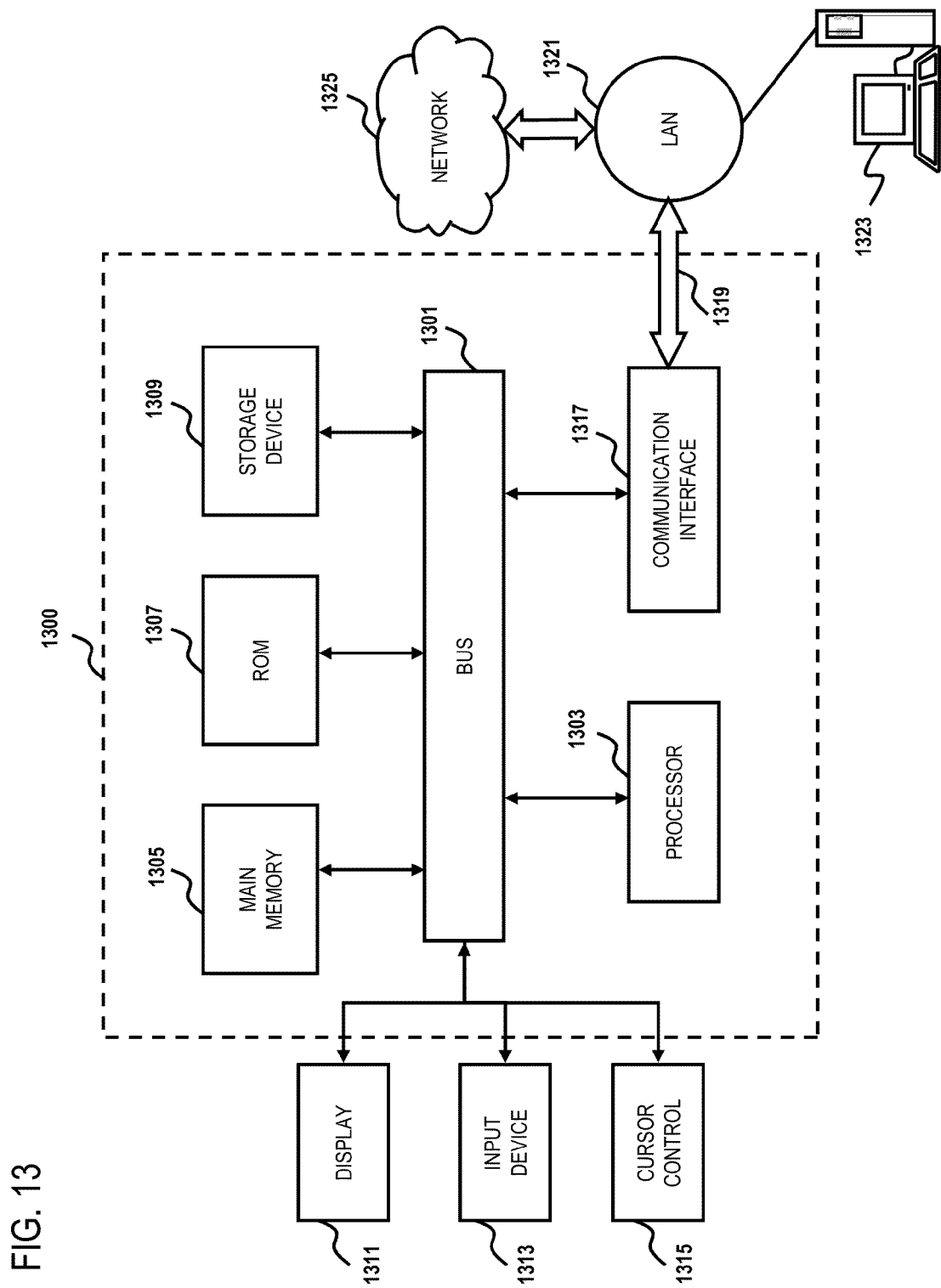
FIG. 13 is a diagram of a computer system that can be used to implement various exemplary embodiment.

FIG. 13 illustrates a computing hardware (e.g., mobile system) 1300 on which exemplary embodiments may be implemented. The mobile system 1300 includes a bus 1301 or other communication mechanism for communicating information and a processor 1303 coupled to the bus 1301 for processing the information. The mobile system 1300 also includes a main memory 1305, such as a Random Access Memory (RAM) or other dynamic storage device, coupled to the bus 1301 for storing the information and instructions to be executed by the processor 903. The main memory 1305 may also be used for storing temporary variables or other intermediate information during execution of instructions by the processor 1303. The mobile system 1300 may further include a Read Only Memory (ROM) 1307 or other static storage device coupled to the bus 1301 for storing static information and instructions for the processor 903. A storage device 1309, such as a magnetic disk or an optical disk, is coupled to the bus 901 for persistently storing information and instructions.

The mobile system 1300 may be coupled via the bus 1301 to a display 1311, such as a Cathode Ray Tube (CRT), a liquid crystal display, an active matrix display, or a plasma display, for displaying information to the mobile user. An input device 1313, such as a keyboard including alphanumeric and other keys, is coupled to the bus 1301 for communicating information and command selections to the processor 1303. Another type of a user input device may be a cursor control 1315, such as a mouse, a trackball, or cursor direction keys, for communicating direction information and command selections to the processor 1303 and for controlling cursor movement on the display 1311.

According to an exemplary embodiment, the processes described herein are performed by the mobile system 1300, in response to the processor 1303 executing an arrangement of instructions contained in the main memory 1305. Such instructions may be read into the main memory 1305 from another computer-readable medium, such as the storage device 1309. Execution of the arrangement of instructions contained in the main memory 1305 causes the processor 1303 to perform the process steps described herein. Processors in a multiprocessing arrangement may also be employed to execute the instructions contained in the main memory 1305. In alternative embodiments, hard-wired circuitry may be used in place of or in combination with software instructions to implement exemplary embodiments. Thus, exemplary embodiments are not limited to any specific combination of hardware circuitry and software.

The mobile system 1300 may also include a communication interface 1317 coupled to the bus 1301. The communication interface 1317 provides a two-way data communication coupling to a network link 1319 connected to a Local Area Network (LAN) 1321. For example, the communication interface 1317 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 1317 may be a Local Area Network (LAN) card (e.g., for Ethernet™ or an Asynchronous Transfer Mode (ATM) network) to provide a data communication connection to a compatible LAN. Wireless links may also be implemented, in one embodiment. In any such implementation, the communication interface 1317 sends and receives electrical, electromagnetic, or optical signals that carry digital data streams representing various types of information. Further, the communication interface 1317 may include peripheral interface devices, such as a Universal Serial Bus (USB) interface, a Personal Computer Memory Card International Association (PCMCIA) interface, etc. Although a single communication interface 1317 is depicted in FIG. 13, multiple communication interfaces may also be employed.

The network link 1319 typically provides data communication through networks to other data devices. For example, the network link 1319 may provide a connection through the LAN 1321 to a host computer 1323, which has connectivity to a network 1325 (e.g., a Wide Area Network (WAN) or the global packet data communication network now commonly referred to as the "Internet") or to data equipment operated by a service provider. The LAN 1321 and the network 1325 both use electrical, electromagnetic, or optical signals to convey information and instructions. The signals through the various networks and the signals on the network link 1319 and through the communication interface 1317, which communicate digital data with the mobile system 1300, are exemplary forms of carrier waves bearing the information and instructions.

The mobile system 1300 may send messages and receive data, including program code, through the network(s), the network link 1319, and the communication interface 1317. In the Internet example, a server (not shown) might transmit requested code belonging to an application program for implementing an exemplary embodiment through the network 1325, the LAN 1321 and the communication interface 1317. The processor 1303 may execute the transmitted code while being received and/or store the code in the storage device 1309, or other non-volatile storage for later execution. In this manner, the mobile system 1300 may obtain application code in the form of a carrier wave.

The term "computer-readable medium" as used herein refers to any medium that participates in providing instructions to the processor 1303 for execution. Such a medium may take many forms, including but not limited to non-volatile media, volatile media, and transmission media. Non-volatile media may include, for example, optical or magnetic disks, such as the storage device 1309. Volatile media may include a dynamic memory, such as the main memory 1305. Transmission media may include coaxial cables, copper wire and fiber optics, including the wires that include the bus 1301. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Figure 14:
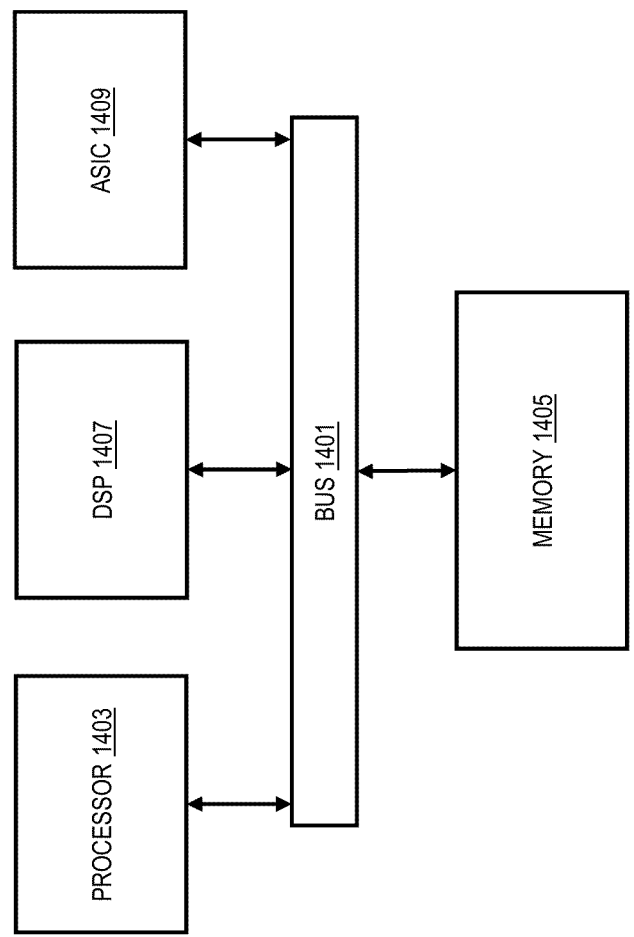
FIG. 14 is a diagram of a computer system that can be used to implement various exemplary embodiments.

FIG. 14 illustrates a chip set 1400 upon which an embodiment of the invention may be implemented. The chip set 1400 is programmed to present a slideshow as described herein and includes, for instance, the processor and memory components described with respect to FIG. 13 incorporated in physical packages (e.g., chips). By way of example, a physical package may include an arrangement of materials, components, and/or wires on a structural assembly (e.g., a baseboard) to provide characteristics such as physical strength, conservation of size, and/or limitation of electrical interaction. It is contemplated that in certain embodiments the chip set 1000 can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include processing cores with each core to perform independently. A multi-core processor enables multiprocessing within a single physical package. Examples of a multi-core processor may include two, four, eight, or greater numbers of processing cores. Alternatively or in addition, the processor 1403 may include microprocessors configured in tandem via the bus 1401 to enable independent execution of instructions, pipelining, and multithreading. The processor 1403 may also be accompanied with specialized components to perform certain processing functions and tasks such as Digital Signal Processors (DSP) 1407, or Application-Specific Integrated Circuits (ASIC) 1409. The DSP 1407 typically processes real-world signals (e.g., sound) in real-time independently of the processor 1403. Similarly, the ASIC 1409 may perform specialized functions not easily performed by a general purposed processor. Other specialized components to aid in performing the inventive functions described herein include Field Programmable Gate Arrays (FPGA) (not shown), controllers (not shown), or other special-purpose computer chips.

The processor 1403 and accompanying components have connectivity to the memory 1405 via the bus 1401. The memory 1405 may include both a dynamic memory (e.g., RAM, magnetic disk, writable optical disk, etc.) and a static memory (e.g., ROM, CD-ROM, etc.) for storing executable instructions that when executed perform the inventive steps described herein to controlling a mobile device. The memory 1405 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
monitoring signal strength information received at a plurality of antennas, wherein the plurality of antennas are mounted on an aerial vehicle, and wherein the plurality of antennas are associated respectively with a plurality of stabilizing control mechanisms of the aerial vehicle, and the plurality of stabilizing control mechanisms including a plurality of stabilizing propellers;
processing the signal strength information to determine control adjustment information for the plurality of stabilizing control mechanisms, the control adjustment information including propeller speed adjustment information; and
transmitting the control adjustment information to the plurality of stabilizing control mechanisms.

2. A method of claim 1, further comprising:
determining the control adjustment information so that the signal strength information received at each of the plurality of antennas are substantially equal, maximized, or a combination thereof.

3. A method of claim 1, further comprising:
determining that the signal strength information for a first one of the plurality of antennas is greater than the signal strength information for a second one of the plurality of antennas; and
specifying a decrease in a propeller speed as the control adjustment information for at least one of the plurality of stabilizing control mechanisms associated with the first one of the plurality of antennas.

4. A method of claim 3, further comprising:
determining that the decrease in the propeller speed would result in the propeller speed being below a minimum threshold;
specifying an increase in a propeller speed as the control adjustment information for at least another of the plurality of stabilizing control mechanisms associated with the second one of the plurality of antennas.

5. A method of claim 1, further comprising:
determining drift information for the aerial vehicle using a location sensor,
wherein the control adjustment information are further based on the drift information.

6. A method of claim 1, wherein the plurality of antennas comprise an untethered microcell, a tethered microcell, or a combination thereof.

7. A method of claim 1, wherein the aerial vehicle is configured with a passive reflector.

8. A method of claim 1, wherein the propeller speed adjustment information includes Pulse Width Modulation (PWM) signals and are individually generated for each of the plurality of stabilizing propellers.

9. An apparatus comprising a processor configured to:
monitor signal strength information received at a plurality of antennas, wherein the plurality of antennas are mounted on an aerial vehicle, and wherein the plurality of antennas are associated respectively with a plurality of stabilizing control mechanisms of the aerial vehicle, the plurality of stabilizing control mechanisms including a plurality of stabilizing propellers;
process the signal strength information to determine control adjustment information for the plurality of stabilizing control mechanisms, wherein the control adjustment information includes propeller speed adjustment information; and
transmit the control adjustment information to the plurality of stabilizing control mechanisms.

10. An apparatus of claim 9, wherein the processor is further configured to:
determine the control adjustment information so that the signal strength information received at each of the plurality of antennas are substantially equal, maximized, or a combination thereof.

11. An apparatus of claim 9, wherein the processor is further configured to:
determine that the signal strength information for a first one of the plurality of antennas is greater than the signal strength information for a second one of the plurality of antennas; and
specify a decrease in a propeller speed as the control adjustment information for at least one of the plurality of stabilizing control mechanisms associated with the first one of the plurality of antennas.

12. An apparatus of claim 11, wherein the processor is further configured to:
determine that the decrease in the propeller speed would result in the propeller speed being below a minimum threshold; and
specify an increase in a propeller speed as the control adjustment information for at least another of the plurality of stabilizing control mechanisms associated with the second one of the plurality of antennas.

13. An apparatus of claim 9, wherein the processor is further configured to:
determine drift information for the aerial vehicle using a location sensor,
wherein the control adjustment information are further based on the drift information.

14. An apparatus of claim 9, wherein the plurality of antennas comprise an untethered microcell, a tethered microcell, or a combination thereof.

15. An apparatus of claim 9, wherein the aerial vehicle is configured with a passive reflector.

16. An apparatus of claim 9, wherein the propeller speed adjustment information includes Pulse Width Modulation (PWM) signals and are individually generated for each of the plurality of stabilizing propellers.

17. A system comprising:
an aerial vehicle configured with a plurality of antennas, wherein the plurality of antennas receive signal strength information, and wherein the plurality of antennas are associated respectively with a plurality of stabilizing control mechanisms, the plurality of stabilizing control mechanisms including a plurality of stabilizing propellers; and
a control platform configured to monitor the signal strength information, process the signal strength information to determine control adjustment information for the plurality of stabilizing control mechanisms, and transmit the control adjustment information to the plurality of stabilizing control mechanisms, and wherein the control adjustment information includes propeller speed adjustment information.

18. A system of claim 17, wherein the control platform is further configured to determine the control adjustment information so that the signal strength information received at each of the plurality of antennas are substantially equal, maximized, or a combination thereof.

19. A system of claim 17, wherein the control platform is further configured to determine that the signal strength information for a first one of the plurality of antennas is greater than the signal strength information for a second one of the plurality of antennas, and to specify a decrease in a propeller speed as the control adjustment information for at least one of the plurality of stabilizing control mechanisms associated with the first one of the plurality of antennas.

20. The system of claim 17, wherein the propeller speed adjustment information includes Pulse Width Modulation (PWM) signals and are individually generated for each of the plurality of stabilizing propellers.

* * * * *